UNITED STATES PATENT OFFICE 2,240,817

PRODUCTION OF HIGH PURITY MAGNESIUM

Fritz Hansgirg, San Mateo, Calif., assignor to American Magnesium Metals Corporation, Pittsburgh, Pa., a corporation of Delaware No Drawing. Application August 31, 1940, Serial No. 355,087. In Japan June 17, 1937

10 Claims. (Cl. 75—67)

This invention relates to the production of metallic magnesium of high purity.

It has been known for many years that magnesia may be reduced with a carbonaceous reducing agent in accordance with the following equation:

$$MgO + C \rightleftarrows Mg + CO$$

Until recently, however, that reaction could not be used for commercially producing magnesium because it was not possible to condense the magnesium vapor to solid or liquid metal, due to the fact that the reaction reversed to an extent and at a rate such that the products of condensation consisted largely or wholly of the starting materials, i. e., magnesium oxide and carbon.

The application of the foregoing reaction was rendered commercially feasible, and has been and is now so practiced at present, by the process disclosed in my United States Patent No. 1,884,993, granted October 25, 1932. In accordance with that invention a mixture of a suitable magnesium compound, advantageously magnesia, and a carbonaceous reducing agent, such as coke, is heated to a temperature at which the equilibrium of the foregoing reaction is practically disposed from left to right in the equation as written, thus producing a mixture of magnesium vapor and carbon monoxide. The mixture thus produced and at that temperature is then admixed with hydrogen or other gas inert to magnesium to suddenly chill the mixture at such a rate and to such a low temperature that reversal of the reaction is inhibited.

The rapidity of chilling used in the process just described results in the production of magnesium in a finely divided, or dusty, form. Under practical operating conditions on a commercial scale the reverse reaction by which magnesium is oxidized by carbon monoxide cannot be completely prevented so that the magnesium dust, or powder, recovered contains some proportion of magnesium oxide and carbon in extremely finely divided form. Also, where impurities are present in the magnesium compound used, they may, and usually will, appear also in the magnesium dust. For example, burned magnesites are commonly used for this purpose. Such ores contain various impurities, chiefly oxides of calcium, iron, silicon, and aluminum. During the reduction process these impurities are also reduced and pass from the furnace with the mixture of magnesium vapor and carbon monoxide so that they are precipitated with the magnesium dust produced in the chilling step, thus contaminating the dust with impurities such as ferrosilicon, calcium carbide, silicon carbide, aluminum carbide, or the like.

Thus it will be seen that the magnesium powder or dust produced by the electrothermal reduction of magnesium oxide with carbon contains amounts of impurities which will depend, at least in part, upon the purity of the raw materials and upon operating conditions. At the present time commercial operations involve, for one reason or another, the production of a dust containing about 65 per cent of metallic magnesium. The magnesium dust in this form must, of course, be refined to produce reguline, or massive, metal of much higher purity. To this end it has been proposed to recover the magnesium metal in various ways. For instance, it has been proposed to heat the dust in an inert atmosphere to a temperature near the boiling point of magnesium under the existing pressure conditions to cause the magnesium droplets in the dust particles to coalesce and flow together. Although this procedure is operable, the recovery of metal may not be as high as economically desirable, and the metal is not sufficiently pure for some purposes.

It has been proposed also to recover magnesium from this dust by subjecting it to distillation. This also is feasible, but in this case also the metal may not be of extremely high purity because of contamination by impurities. The dust is extraordinarily fine, the average size of the particles being less than one-tenth of a micron. For this reason the dusty impurities tend to be entrained by the magnesium vapors and thus to appear in the condensed metal. To overcome this it has been proposed to briquette the magnesium dust in various ways, one proposal being to mix the dust with hydrocarbon oils and bake the mixture to form solid masses by evaporation and cracking of the oil. Also, it has been proposed to briquette the dust with or without other binders. Although such agglomerated bodies may tend to retain some proportion of the dusty impurities, metal of still higher purity than obtainable in such manner would be desirable, and in any event the boiling point of magnesium at atmospheric pressure is so high as to create difficulties, either economic or procedural, with the apparatus.

The object of this invention is to provide a process of treating finely divided metallic magnesium, more especially magnesium dust, or powder, produced by electrothermal reduction of magnesium oxide with a carbonaceous reducing agent, which overcomes or reduces the foregoing difficulties and disadvantages of prior procedures, which is simple, economical, readily practiced, and highly efficacious, which produces magnesium metal of extremely high purity and in a form in which it may be handled without substantial contamination, which does not require complicated or expensive apparatus, and which does not require critical and highly experienced control. Other objects will appear from the following description.

In accordance with the invention the finely divided impure metallic magnesium such, for example, as that produced by the practice of the invention of my aforesaid patent, is formed into agglomerated bodies which are then heated in a closed gas-tight container in the presence of a gas reactive with metallic magnesium. The gas present reacts with a small portion of the magnesium thus effecting evacuation of the container so that upon continued heating, without breaking the vacuum produced, the magnesium content of the agglomerated dust is vaporized. The vapors are then condensed to recover solid metallic magnesium. Under these conditions of operation, as I have found by actual operation on a commercial scale, metal of extremely high purity and in a readily handled form is produced easily.

In the practice of the invention the magnesium dust may be agglomerated in various ways, as by briquetting the dust with or without a binder. Among the binders that may be used are hydrocarbon oils which, when the briquettes are heated, will in part evaporate and in part crack to form a carbonaceous residue which acts to bind the dust strongly. As thus prepared the briquettes may be handled freely, but if no binder be used they must be kept in an atmosphere of hydrogen or other reducing gas until they are placed in the retort.

The prepared briquettes are then introduced into a retort adapted to withstand high vacuum without leakage of the external atmosphere into the retort.

There is also introduced into the retort a gas which, as stated, is reactive with magnesium, examples being oxygen, nitrogen, air, carbon monoxide, carbon dioxide, halogens, sulfur dioxide, and others which will react with metallic magnesium, at least under the influence of heat, to form compounds therewith. Of the common gases, only hydrogen and the noble gases as well as the more stable hydrocarbons, such as methane, can not be used for this purpose because they do not form compounds with magnesium.

The amount of reactive gas used in the practice of the invention will depend upon various factors such, for example, as the free space within the retort, the degree of vacuum to be produced, the temperature at which vaporization is to be effected, and the like. Generally speaking, however, relatively small amounts of gas suffice, and since magnesium is consumed in reaction of the gas, it is desirable to use as little gas as consistent with adequate operation of the process. However, generally speaking, this is not serious to the economics of magnesium production because I have found that in commercial operation a satisfactorily high vacuum may be produced with a loss of magnesium due to such reaction which is not in excess of about 0.02 per cent of the magnesium charged into the retort.

For most purposes it is desired to produce a relatively high vacuum within the retort because, other things being equal, the higher the vacuum the more rapid will be the rate of vaporization of the magnesium. In operating with nitrogen as the reactive gas under conditions productive of the loss of metal just stated, the pressure within the retort produced was approximately 0.5 mm. of mercury, under which pressure it is possible to sublime the magnesium at a temperature in the vicinity of its melting point. This is obviously advantageous because the apparatus used is less subject to deterioration and need be less massive than in the case of apparatus used for distillation at atmospheric pressure.

Operation in vacuum of approximately the order of magnitude stated is desirable not only for the reason just stated, but also because under such conditions the vaporization is sufficiently rapid for commercial purposes while on the other hand the rate of vaporization is such that there is no tendency for the vapors to carry over dusty impurities.

The exact temperature used will depend in part upon the rate of vaporization desired, and also upon the particular degree of vacuum within the retort. I have found, however, that satisfactory practice may be had by heating the retort at about 600° to about 850° C., from which it will appear that the metal may be vaporized from the solid or from the liquid state.

The retort and its contents are heated to cause reaction between the magnesium and the reactive gas. Thereafter heating is continued while maintaining the vacuum produced to cause the magnesium to vaporize, and the vapors are removed and condensed. This may be accomplished in various ways, as will be understood by those skilled in the art, but, generally speaking, the temperature gradient between the vapor and the condensing surface should not be too great so as to avoid production of metal in finely divided form. Perhaps the most simple practice involves the use of a tubular retort the lower end of which contains the agglomerated magnesium bodies, or briquettes, and which is heated, the upper end of the retort being exposed to the atmosphere so that it is cooler than the heated end, whereby the magnesium vapors produced will flow from the lower to the upper end and there be condensed. Any apparatus used in the practice of the invention must, of course, be capable of withstanding high vacuum.

In the practice of the invention as described the magnesium vapor condenses in the form of crystalline aggregates of extremely high purity. When removed from the condenser these aggregates may be melted to form castings, ingots, billets, or other coherent bodies of massive magnesium. Inasmuch as in melting there is the likelihood that the magnesium will react with constituents of the surrounding atmosphere, it is preferable, where such contamination is unavoidable, to form such coherent bodies by the application of pressure to the crystalline aggregates. Among the various ways that this may be done is to place the solidified metal within an extrusion press which is then operated to weld the charge body of desired shape and size. In all such pressing operations the pieces of metal weld readily, because of their purity and under the influence of pressure, to form perfectly integral coherent bodies similar in nature to those which might be produced by casting or by casting and subsequent working of ingots or billets. Obviously, in this manner there may be produced ingots or billets for further working, or shapes in final form of desired contour and size may be produced directly.

Magnesium dust as produced in accordance with the process of my aforementioned patent generally carries substantial amounts of adsorbed hydrogen which would be liberated when the dust is heated in the retort. The presence of such an inert gas would thus prevent the production of the desired vacuum, or at least attainment of the desired vacuum, and would prevent or impede vaporization. When finely divided magnesium which is to be treated in accordance with the invention thus carries adsorbed gases, the latter should be removed prior to application of the invention. To this end the agglomerated bodies, or briquettes, may be heated in the retort to free them from inert gases. The attainment of that end can be determined readily by observing the pressure within the retort; when the maximum pressure has been reached, the agglomerated bodies are in condition for application of the present process. When the gases inert to magnesium have been driven from the agglomerated bodies the pressure within the retort, which may reach three atmospheres, is released and the remaining inert gas is replaced by a gas which is reactive with magnesium. Alternatively, the inert gas may be pumped off and the reactive gas then introduced, or both procedures or combinations of them may be applied. After the reactive gas has been introduced the process is applied as described hereinabove. Another procedure which may be followed, especially with briquettes made with a protective binder, is to pass the agglomerated bodies, e. g., immediately after they are formed, into a batch or a continuous furnace in which they are heated to drive off all of the gases inert to magnesium. Thereafter the briquettes may be placed in a retort and treated in accordance with this invention.

According to the provisions of the patent statutes I have explained the principle and method of practicing my invention and have described what I now consider to represent its best embodiment. However, I desire to have it understood that, within the scope of the appended claims, the invention may be practiced otherwise than as specifically described.

I claim:

1. That method of making metallic magnesium of high purity from impure magnesium which comprises heating said impure magnesium in a closed gas-tight container in the presence of a gas reactive with metallic magnesium and thereby producing vacuum in said container, and while maintaining said vacuum continuing to supply heat and thereby vaporize magnesium, and then condensing said vapor to form metallic magnesium of high purity.

2. That method of making metallic magnesium of high purity from impure magnesium dust produced by thermal reduction of magnesium oxide with carbon which comprises forming said dust into agglomerated bodies, heating said bodies in a closed gas-tight container in the presence of a gas reactive with metallic magnesium to thereby produce vacuum in said container, and while maintaining said vacuum continuing to supply heat and thereby vaporize magnesium, and then condensing said vapor to form metallic magnesium of high purity.

3. That method of making metallic magnesium of high purity from impure magnesium dust produced by thermal reduction of magnesium oxide with carbon which comprises forming said dust into agglomerated bodies, heating said bodies in a closed gas-tight container in the presence of a gas reactive with metallic magnesium in an amount to thereby produce high vacuum in said container, and while maintaining said vacuum continuing to supply heat and thereby vaporize magnesium, and then condensing said vapor to form metallic magnesium of high purity.

4. A process according to claim 3, said bodies being heated to between about 600° to 850° C.

5. That method of making metallic magnesium of high purity from impure magnesium dust produced by thermal reduction of magnesium oxide with carbon which comprises forming said dust into agglomerated bodies, heating said bodies in a closed gas-tight container in the presence of a gas reactive with metallic magnesium in an amount to thereby produce high vacuum in said container, and while maintaining said vacuum continuing to supply heat, the temperature and pressure being such as to cause the magnesium of said bodies to sublime, and recovering the sublimed magnesium.

6. That method of making metallic magnesium of high purity from impure magnesium dust produced by thermal reduction of magnesium oxide with carbon which comprises forming said dust into agglomerated bodies, heating said bodies to about 600° to 850° C. in closed gas-tight container in the presence of a gas reactive with metallic magnesium in an amount to thereby produce a high vacuum in said container under which the magnesium will sublime at the temperature used, and while maintaining said vacuum continuing to supply heat and thereby sublime pure magnesium which is condensed in said container.

7. That method of making metallic magnesium of high purity from impure magnesium dust produced by thermal reduction of magnesium oxide with carbon which comprises forming said dust into agglomerated bodies, heating said bodies to release inert gas carried by said bodies, then heating said bodies in a closed gas-tight container with a gas reactive with metallic magnesium to produce vacuum in said container, and while maintaining said vacuum continuing to supply heat and thereby produce pure magnesium vapor, and then condensing said vapor to form metallic magnesium of high purity.

8. That method of making metallic magnesium of high purity from impure magnesium dust produced by thermal reduction of magnesium oxide with carbon which comprises forming said dust into agglomerated bodies, heating said bodies in a closed gas-tight container to release inert gas carried by said bodies, then heating said bodies in a closed gas-tight container at about 600° to 850° C. with a gas reactive with metallic magnesium to produce high vacuum in said container, and while maintaining said vacuum continuing to supply heat and thereby produce pure magnesium vapor, and then condensing said vapor to form metallic magnesium of high purity.

9. That method of making metallic magnesium of high purity from impure magnesium dust produced by thermal reduction of magnesium oxide with carbon which comprises forming said dust into agglomerated bodies, heating said bodies to about 600° to 850° C. in a closed gas-tight container to release inert gas carried by said bodies, continuing such heating until the maximum pressure is produced in said container, then replacing said gas by a gas reactive with metallic magnesium in an amount to produce high vacuum in said container, and while maintaining said vacuum continuing to supply heat and thereby produce pure magnesium vapor, and then condensing said vapor to form metallic magnesium of high purity.

10. That method of making metallic magnesium of high purity from impure magnesium dust produced by thermal reduction of magnesium oxide with carbon which comprises forming said dust into agglomerated bodies, heating said bodies in a closed gas-tight container with a gas reactive with metallic magnesium in an amount to produce high vacuum in said container, maintaining said vacuum and continuing to supply heat and thereby produce pure magnesium vapor, then condensing said vapor to form metallic magnesium of high purity, and recovering the condensed metal and forming it into desired shapes by the application of pressure thereto without intermediate melting.

FRITZ HANSGIRG.